United States Patent [19]
Alfred et al.

[11] Patent Number: 6,101,065
[45] Date of Patent: Aug. 8, 2000

[54] DISK DRIVE WITH SEEK PROFILE SELECTION BASED ON READ/WRITE OPERATION

[75] Inventors: Steven J. Alfred, Chatfield; Eric Gregory Oettinger, Rochester, both of Minn.

[73] Assignee: Western Digital Corporation, Irvine, Calif.

[21] Appl. No.: 09/050,519

[22] Filed: Mar. 30, 1998

[51] Int. Cl.[7] ........................................................ G11B 5/55
[52] U.S. Cl. ........................ 360/78.04; 360/60; 360/78.07
[58] Field of Search .................................. 360/78.09, 60, 360/75, 78.04, 78.06, 78.07, 78.14

[56] References Cited

U.S. PATENT DOCUMENTS

| | | |
|---|---|---|
| 4,937,689 | 6/1990 | Seaver et al. . |
| 5,150,266 | 9/1992 | Albert ................................... 360/78.04 |
| 5,859,742 | 1/1999 | Takaishi ........................... 360/78.09 X |
| 6,002,544 | 12/1999 | Yatsu .................................... 360/78.09 |

FOREIGN PATENT DOCUMENTS 5-258487  10/1993  Japan .

*Primary Examiner*—Paul Loomis
*Assistant Examiner*—James L Habermehl
*Attorney, Agent, or Firm*—Milad G. Shara

[57] ABSTRACT

A method for reducing data access time in a disk drive. The disk drive includes an actuator and a servo controller. The servo controller commands the actuator to perform a seek from a current position to a target position using a profile of command effort to the actuator. The profile comprises an acceleration profile and a deceleration profile. In one aspect, the method includes defining a read profile for a seek used to position the actuator to execute a read command. A write profile is defined for a seek used to position the actuator to execute a write command, the write profile being different from the read profile for a respective seek distance. The read and write seeks are performed using the read profile and the write profile. The average time required for performing a seek command is reduced as a result of the difference between the read profiles and the write profiles.

16 Claims, 12 Drawing Sheets

DISK DRIVE WITH SEEK PROFILE SELECTION BASED ON READ/WRITE OPERATION

BACKGROUND OF THE INVENTION

1. Field of the Invention

The present invention relates to a disk drive having reduced data access time in performing a track seeking operation, and more particularly, a disk drive apparatus and method for selecting a seek profile based on a read or write command for reducing data access time in the disk drive.

2. Description of the Prior Art

One measure of performance of a hard disk drive is its data access time. Data is stored on data storage disks in concentric data "tracks", which are divided into "wedge-like" sectors. Servo information is recorded in the radially continuous narrow wedges between sectors, including track number, sector number and tracking information. To maximize performance of a disk drive, it is desirable to minimize data access time, including the time required to move the disk drive actuator from a current data track to the "target" data track.

The process of moving a head from a current track position to a desired or target track position is known as a "seek". The disk drive includes a servo system that is utilized both to seek to a selected target track and thereafter follow the target track on the data storage disk. A seek to a selected target track is commonly made in accordance with a profile of command effort to the actuator for a respective seek distance, which is stored in memory and accessible by the servo system controller. In known embodiments, the same seek profile is utilized for a given distance for execution of read and write commands.

The seek profile can be described in terms of acceleration, velocity, or position. A seek profile can include three components; an acceleration profile, an optional coast profile, and a deceleration profile. The acceleration profile (typically, but not necessarily set to the maximum acceleration permitted by the hardware) involves the initial portion of the seek when the actuator is gaining speed. The coast profile, which may or may not be used, holds the velocity substantially constant at some predetermined velocity. The deceleration profile ends with both acceleration and velocity close to zero as the head approaches the target track.

In FIGS. 1–4, sample idealized acceleration and velocity seek profiles for two prior art seeks for a given distance are shown. Referring to FIGS. 1 and 2, acceleration and velocity profiles graphically illustrate a first prior art seek operation. In FIG. 1, the actuator is commanded to accelerate at time T0. This acceleration is maintained until the velocity of the actuator reaches a peak value VCREST, shown in FIG. 2. This occurs at time Tswitch. The actuator is then commanded to decelerate, until time Tend at which time the deceleration and velocity are brought back to zero, and the head is positioned at the target track.

Referring to FIGS. 3 and 4, acceleration and velocity profiles graphically illustrate another prior art seek operation in which a coast period is used. As illustrated, at time T0 the actuator is commanded to accelerate. This acceleration is held until the actuator reaches maximum velocity VCREST at time Tm, where Tm is the length of time required to reach maximum velocity. In this example, the maximum velocity VCREST is held (in a "coast" mode) until time Tn at which time the actuator is commanded to decelerate so that the velocity decreases to zero at time Tend.

The velocity profiles illustrated in FIGS. 2 and 4 are idealized profiles in which the head velocity reaches zero at time Tn. It is understood in the art that many variables, including resonant modes of the actuator and stored energy in the actuator, prevent a precise correction of actuator velocity which would result in the head landing exactly on track at the conclusion of the seek. These variables may cause the head to overshoot the target track. In any event, a settling period is required to position the head within an acceptable range of the target track center. The settling period adds to the total time of the seek operation and may be extended or reduced according to the shape of the applied seek profile (e.g., a more aggressive, or faster profile will cause larger and longer residual vibrations).

Disk drives are capable of storing large amounts of data in part due to a corresponding high density of data tracks on the disk. As such, the heads must be closely aligned with the target track for reading and/or writing of data without error. Off track thresholds or windows are defined about the tracks beyond which reading or writing will not take place. These can be termed a read settle window and a write settle window.

Read settle and write settle window criteria are primarily defined by head width parameters. The required size of the head corresponds to the density of data tracks on the disk. Proximity of the head to the target track during a write operation is more critical than a read operation due to the potential of corrupting data in an adjacent track. As such, the required read settle window for execution of a read command is typically much wider than a write settle window for execution of a write command. Execution of a read command outside of the read settle window may result in a read error. The read error may cause a "retry", which can result in the disk being rotated through a full revolution before the location to which the data is to be read comes into alignment with the read head. Execution of a write operation outside of the write settle window can result in data being partially written to an adjacent track, which corrupts previously stored data therein. Because read and write errors can greatly increase the time required to access a disk drive target track for execution of a read or write operation, the servo controller tries to ensure that the head is properly aligned with the target track and the vibrations owing to a seek have reached acceptable limits (i.e., the head is staying within the window) before execution of a read command or write command.

Known systems utilize the same seek profile to position the head for execution of a read or write operation. Such profiles do not provide optimal disk drive data access times, as they may be overly conservative on read seeks which do not require as strict head positioning and alignment criteria as the execution of a write command, or may err on the aggressive side and cause unnecessarily long write settles.

SUMMARY OF THE INVENTION

In one embodiment, the present invention provides a method of reducing data access time in a disk drive having an actuator and a servo controller. The servo controller commands the actuator to perform a seek from a current position to a target position using a profile of command effort to the actuator. The profile comprises an acceleration profile and a deceleration profile. The method includes the step of defining a read profile for a seek used to position the actuator to execute a read command. A write profile is defined for a seek used to position the actuator to execute a write command. The write profile is different from the read profile for a respective seek distance. Read and write seeks are performed using the respective read profile and write profile. The read and write commands are executed, and the average time required for performing a seek command is reduced as a result of the difference between read profiles and write profiles.

A settle window can be used to define the required proximity of the actuator to the target position for execution of a command. The method can further include defining a read settle window for execution of a read command. A write settle window is defined for execution of a write command. The write settle window being different than the read settle window. In one aspect, the read settle window is wider than the write settle window.

In one aspect, the position of the actuator relative to the target position is sampled at predetermined time intervals. The read and write commands are executed after a desired consecutive number of samples fall within the corresponding read settle window or write settle window.

The step of defining the read profile can further include defining a read acceleration profile. The step of defining the write profile can further include defining a write acceleration profile, the write acceleration profile being different from the read acceleration profile for a respective seek distance.

Defining the read acceleration profile can include a maximum read acceleration value. Defining the write acceleration profile can include a maximum write acceleration value, wherein the maximum read acceleration value is greater than the maximum write acceleration value.

The step of defining the read acceleration profile can include a read maximum velocity value. Defining the write acceleration period includes a write maximum velocity value, the maximum read velocity value being greater than the maximum write velocity value.

The step of defining the read profile can further include the step of defining a read deceleration profile. The step of defining the write profile can further include the step of defining a write deceleration profile, the read deceleration profile being different than the write deceleration profile for a respective seek distance.

The step of defining the read profile can further include the step of defining a read coast profile. The step of defining the write profile can further include the step of defining a write coast profile, the write coast profile being different from the read coast profile for a respective seek distance.

In another embodiment, the present invention provides a method of reducing data access time in a disk drive having an actuator and a servo controller. The servo controller commands the actuator to perform a seek from a current position to a target position using a profile of command effort to the actuator. The profile includes an acceleration profile and a deceleration profile. A window is used to define the required proximity of the actuator to the target position for execution of a command. The method includes the steps of defining a read profile for a seek used to position the actuator to execute a read command. A write profile is defined for a seek used to position the actuator to execute a write command, the write profile being different from the read profile for a respective seek distance. A read settle window is defined for execution of a read command. A write settle window is defined for execution of a write command, the read settle window being wider than the write settle window. Read and write seeks are performed using the corresponding read profile and the read settle window, and the write profile and the write settle window. Read and write commands are executed. The average time required for performing a seek command is reduced as a result of the difference between read profiles and read settle windows, and write profiles and write settle windows.

The position of the actuator relative to the target position can be sampled at predetermined time intervals. The read and write commands are executed after a desired consecutive number of samples fall within the corresponding read settle window or write settle window.

In the above embodiment, the step of defining the read profile further includes defining a read acceleration profile. The step of defining the write profile further includes defining a write acceleration profile, the write acceleration profile being different from the read acceleration profile for a respective seek distance.

Defining the read profile may further include the step of defining a read deceleration profile. Defining the write profile may further include the step of defining a write deceleration profile. In one aspect, the read deceleration profile is different than the write deceleration profile. The step of defining the read profile can further include the step of defining a read coast profile. The step of defining the write profile can further include the step of defining a write coast profile, the read coast profile being different the write coast profile.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention.

DETAILED DESCRIPTION

The present invention provides a disk drive having seek profile selection based on read or write operation resulting in reduced data access times. By using different seek profiles to position a head for read and write operations for a given distance, both read and write operations are optimized. The different read and write seek profiles in combination with different read and write settle criteria result in increased disk drive performance.

Figure 1:
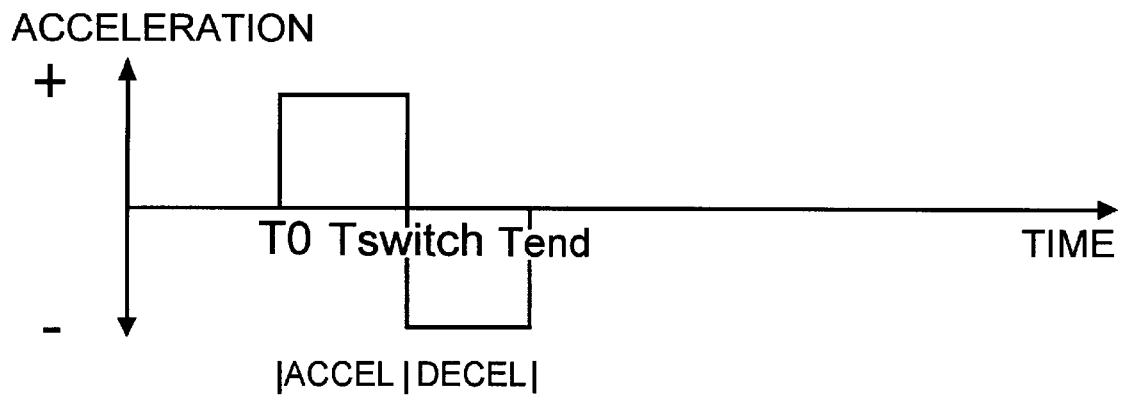
FIG. 1 is a graph illustrating a prior art seek profile showing a plot of acceleration versus time.
Figure 2:
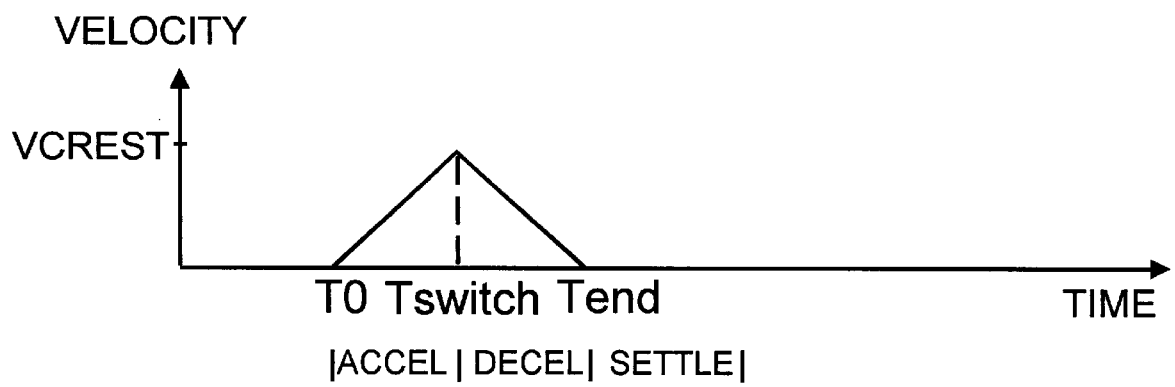
FIG. 2 is a graph illustrating a prior art velocity profile corresponding to the acceleration seek profile of FIG. 1.
Figure 3:
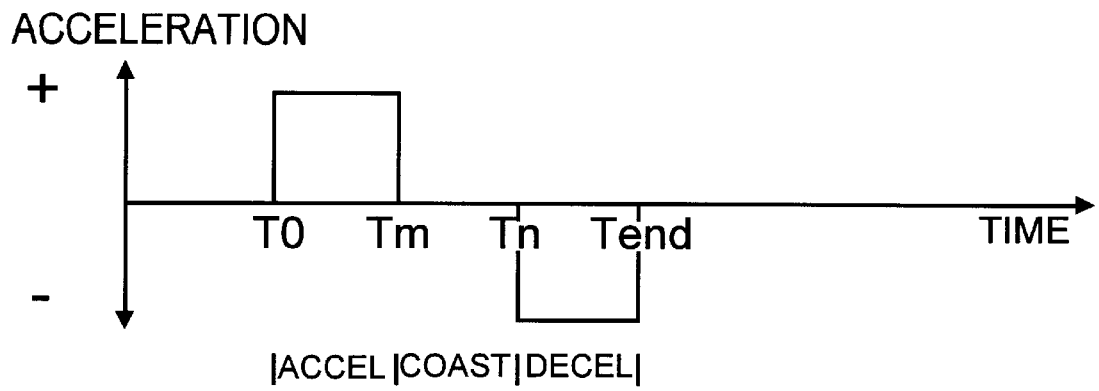
FIG. 3 is a graph illustrating another prior art seek profile showing a plot of acceleration versus time in which a coast period is utilized.
Figure 4:
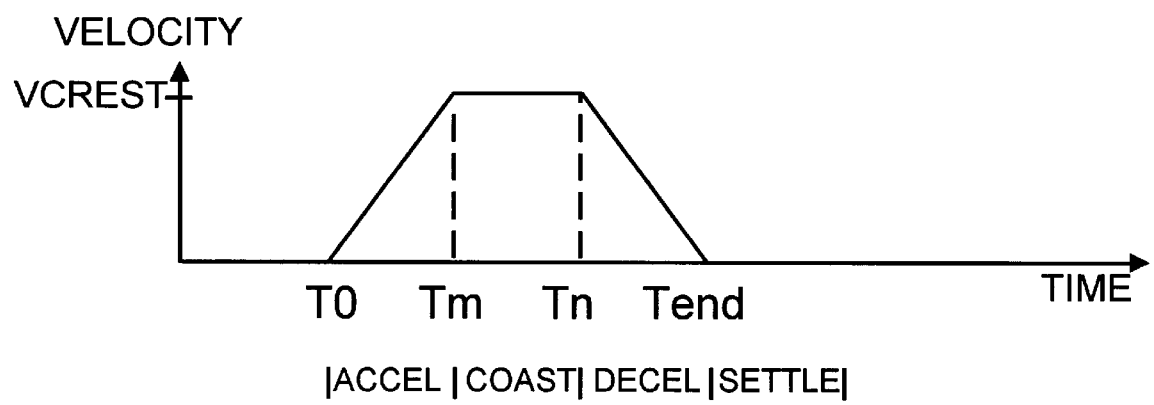
FIG. 4 is a graph illustrating a velocity seek profile corresponding to the acceleration seek profile of FIG. 3.
Figure 5:
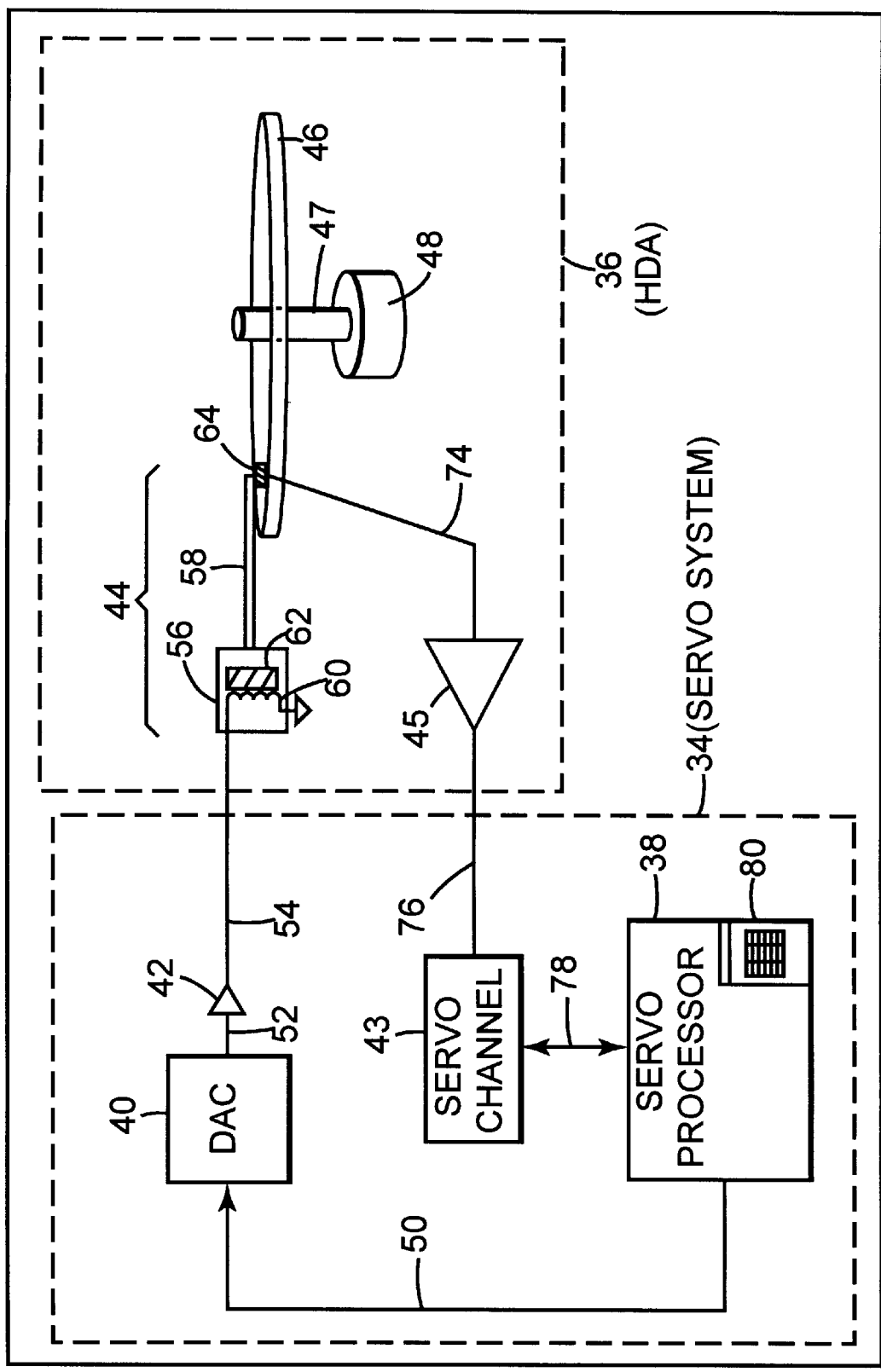
FIG. 5 is a block diagram illustrating one embodiment of a hard disk drive system having different seek profile selection based on read or write operation for reduced data access times in accordance with the present invention.

In FIG. 5, a hard disk drive 30 in accordance with the present invention is shown. Disk drive 30 comprises servo system 34 and head disk assembly (HDA) 36. Servo system 34 forms a portion of an intelligent controller which provides an interface between a host (not shown) and HDA 36 for execution of read and write commands. The host can include a microprocessor based data processing system (e.g., a computer) or other system capable of performing a sequence of logical operations. Servo system 34 includes servo processor 38, digital-to-analog converter (DAC) 40, coil driver 42, and servo channel 43. HDA 36 includes actuator assembly 44, pre-amp 45, and one or more disks 46 stacked on a spindle 47. The spindle 47 is mechanically coupled to a motor 48 for rotating the magnetic media disks 46 at a high rate of speed.

Servo processor 38 operates to position transducer 64 over disk 46 for subsequent execution of read or write commands. Servo processor 38 provides a digital output signal 50 to DAC 40, which is representative of the command output to actuator assembly 44. Digital-to-analog converter 40 is responsive to signal 50, and provides a corresponding analog output signal 52 to coil driver 42. In response to output signal 52, coil driver 42 provides a current output 54 to voice coil motor (VCM) 56 included in actuator assembly 44.

As shown, VCM 56 includes a coil 60 moving in proximity to permanent magnet 62. Actuator assembly 44 includes actuator arm 58 mechanically coupled to (VCM) 56. Actuator arm 58 includes a head positioned adjacent data storage disk 46. VCM 56 is used to swing the actuator arm 58, and head 64 back and forth over the data storage disk to access desired data tracks. The maximum acceleration and velocity of the head 64 across the data storage disk is dependent upon the amount of current transmitted to the voice coil 60 from coil driver 42. As is well known, HDA 36 may comprise a plurality of disks 46 with a corresponding plurality of actuator arms 58 and heads 64.

Pre-amp 45 is electrically coupled to head 64 for receipt and amplification of a position signal 74 which is representative of the position of head 64 on the disk 46. Pre-amp 45 provides an amplified output signal 76 to servo channel 43. In response, servo channel 43 provides an output signal in path 78 to servo processor 38 which is representative of the position of head 64 on the disk 46.

In operation of disk drive 30, servo system operational programs are stored in nonvolatile memory (e.g., ROM or flash memory) or disk drive reserve cylinders and loaded into RAM for execution. In one exemplary embodiment of disk drive 30 in accordance with the present invention, separate read seek profiles and write seek profiles for a corresponding seek distance are stored in ROM or flash memory within servo memory 80 (e.g., in look-up tables as shown). Upon start up of disk drive 30, disk drive programs, including the read seek profiles and write seek profiles are transferred into RAM such that they may be accessed by servo processor 38 for positioning head 64 for execution of a read or write command.

Servo processor 38 receives a command to position actuator 44 for accessing data at a specified desired track location or "target track" on disk 46. The current track position of 178 actuator assembly read/write transducer heads 64 is stored in servo memory 80, such that servo processor 38 may determine the required seek distance between the current track and target track on disk 46. Based on the seek distance, servo processor 38 retrieves the corresponding read or write seek profile from servo memory 80, and provides an output signal 50 to DAC 40 corresponding to the seek profile. In accordance with the present invention, a different seek profile is retrieved for a read command than for a write command for a seek distance, reducing data access times for disk drive 30.

In accordance with the digital output signal 50 received from servo processor 38, DAC 40 provides an analog output signal 52 to coil driver 42 representative of the seek profiles. Coil driver 42 provides a current output 54 to coil 60 for acceleration and/or deceleration of actuator arm 58 to perform a seek operation to move read/write transducer head 64 from the current track position to the target track position. As the actuator arm 58 moves from the current track position to the target track position, position information is received through the sensing of servo wedges disposed on disk 46. Based on this position information, a position signal 74 is provided through pre-amp 45 and servo channel 43 to servo processor 38, wherein the position signal 74 is representative of the position of the read/write transducer head 64 on disk 46. Upon completion of a seek operation and alignment of the read/write transducer heads 64 at the desired target track, a read or write command can be executed (data may be read from the target track or written to the target track).

Figure 6A:
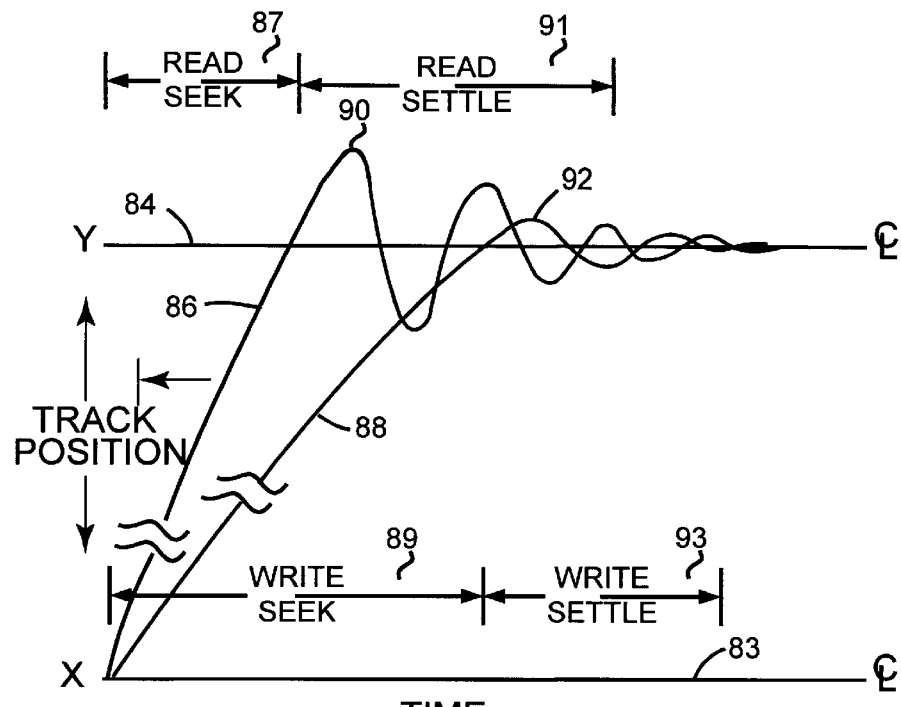
FIG. 6A is a graphical representation illustrating one embodiment for implementing different seek operations for positioning a head from current track x to a target track y, for execution of a read or write command, in accordance with the present invention.
Figure 6B:
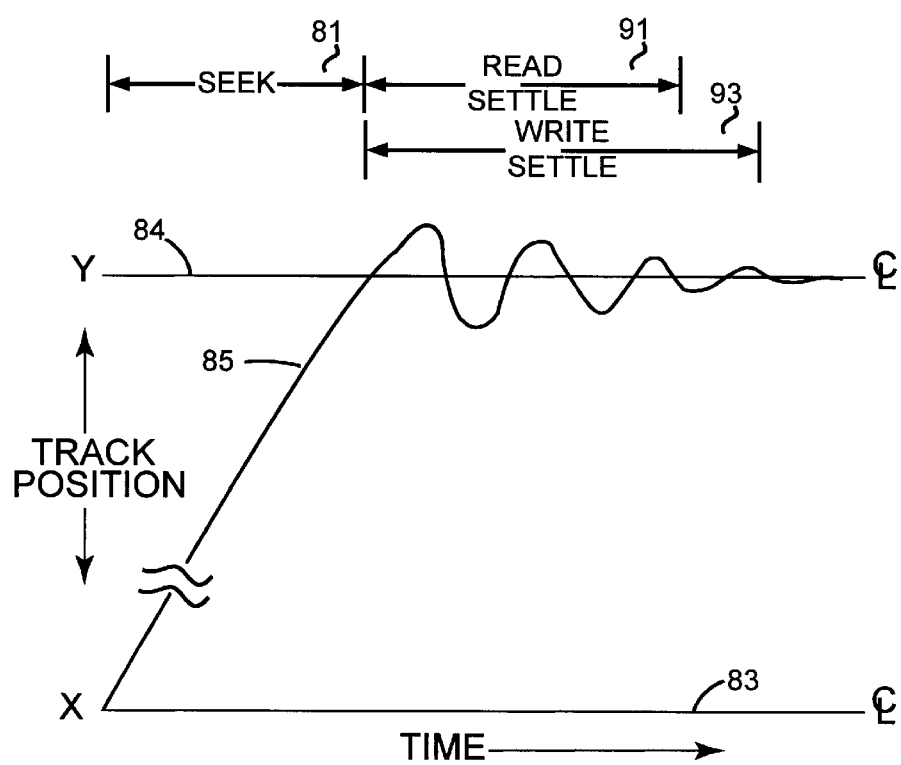
FIG. 6B is a graphical representation of a prior art dual use single seek profile for positioning a head from current track x to a target track y, for execution of both a read command and a write command which may be compared to FIG. 6A to illustrate the advantage in reduced data access time provided by the invention.

Referring to FIGS. 6A and 6B, seek profile position plots are shown illustrating a comparison between different seek profiles used for positioning a head for execution of a respective read or write operation (FIG. 6A) in accordance with the present invention, and one embodiment of a prior art, dual use seek profile used for both read and write commands (FIG. 6B.)

In FIG. 6A, the seek operations are read and write seek operations from current track X 83 to target track Y 84, and as such, follow a seek profile corresponding to the desired read seek or write seek operation for a given seek distance. The graphical representation illustrates the position of the head relative to target track Y 84 versus time. A position plot of a read seek profile is illustrated at 86 with a corresponding read seek period (time to reach the target track) indicated at 87, and a position plot of write seek profile is illustrated at 88 with a corresponding write seek time period indicated at 89.

Read seek profile 86 follows a more aggressive profile than write seek operation 88, illustrated by reaching the target track Y 84 sooner. During aggressive read seek 86, as the head approaches target track Y 84, the actuator contains a relatively large amount of energy and has more transients due to more excitation of mechanical resonances, and as such, "over shoots" target track Y 84, indicated at 90, until the servo system 34 brings the transducer head 64 into closer alignment with target track Y 84. Although aggressive seek 86 reaches target track Y 84 faster but significantly "overshoots" target track Y 84, the settle criteria to position the actuator after reaching the target track is less strict than that for a write operation and, as such, may have a relatively short read settle period 91.

A less aggressive write seek is indicated at 88. Note that the write seek arrives at the target track later than read seek 86. Although the less aggressive write seek 88 also overshoots target track Y 84, indicated at 92, the actuator contains less energy as it approaches target track Y 84, and as such, exhibits significantly less overshoot and smaller transients, and therefore settles into relatively closer alignment with target track Y 84 during write settle period 93. Since write seek 89 is less aggressive than read seek 87, it takes a longer period of time, indicated by the comparative lengths of write seek 89 and read seek 87, to reach target track Y, however, a shorter settle period provides an overall improvement versus the dual use profile of FIG. 6B.

In FIG. 6B, a disk drive using a prior art dual use seek 81 (i.e. a compromised one suitable for both read and write operations) for both read and write and operations is shown. As illustrated, the dual use or "combination" prior art seek 81 results in the head following prior art dual use profile 85. The dual use seek 85 results in seek period 81 and corresponding read settle 91 or write settle 93 which is longer than a corresponding read operation (read seek 87 and read settle 91) or write operation (write seek 89 and write settle 93) of the present invention illustrated in FIG. 6A. The dual use profile would disadvantageously delay execution of the read command due to the later arrival at the target track inherent in a less aggressive seek or contain more transients than are desired for the write seek which are inherent in a more aggressive seek.

Figure 7:
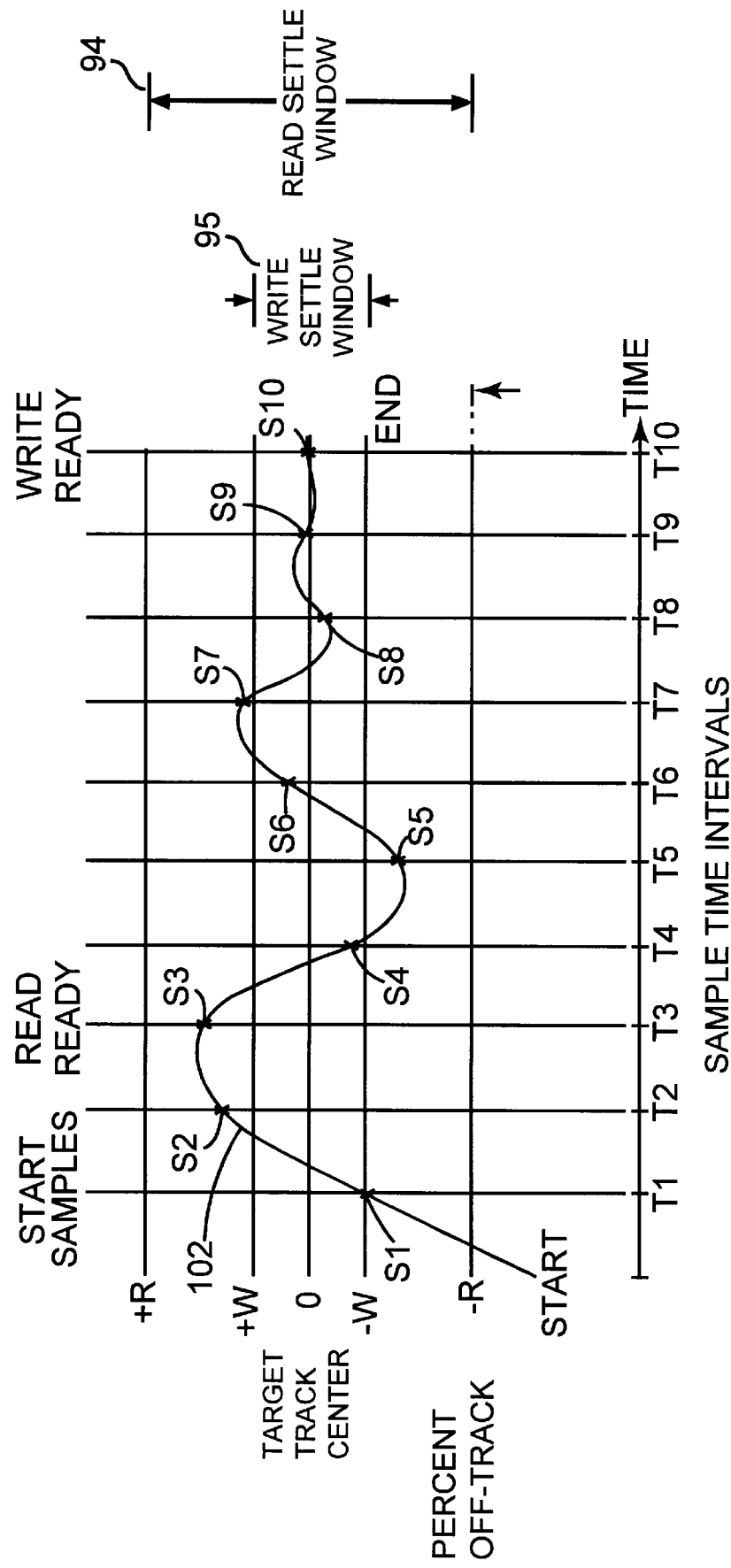
FIG. 7 is a diagram illustrating a portion of a seek operation including positioning and alignment of a disk drive head within a read settle window or write settle window for execution of a command.

In FIG. 7, a position plot illustrates a portion of a seek operation, including positioning and alignment of a disk drive actuator head within a read "settle" window 94 or write "settle" window 95 for execution of a command. The graphical representation of FIG. 7 illustrates the difference in settle criteria for execution of a read operation or a write operation. Since a write operation is more critical (than a read operation) due to the potential of corrupting data on an adjacent track, a write transducer head must be closely aligned over the target track center for execution of a write command. In FIG. 7, position plot 102 illustrates the position of a transducer head relative to TARGET TRACK CENTER, during the settling period.

In one embodiment of the invention, a READ SETTLE WINDOW 94 and a WRITE SETTLE WINDOW 95 are defined. The READ SETTLE WINDOW 94 is defined as the read position limits relative to TARGET TRACK CENTER and is dependent upon track pitch (i.e., track density). A read operation cannot be executed without undue risk of error if the read transducer head is positioned outside of the READ SETTLE WINDOW 94. Similarly, WRITE SETTLE WINDOW 95 defines the position limits relative to TARGET TRACK CENTER in which a write operation may be executed. A write command is not allowed to be executed when the transducer is positioned outside of the WRITE SETTLE WINDOW 95. As previously indicated herein and illustrated in FIG. 7, the READ SETTLE WINDOW 94 is wider than the WRITE SETTLE WINDOW 95.

Since a transducer head may over shoot TARGET TRACK CENTER as the servo system brings it into alignment with TARGET TRACK CENTER during the settling period, it is necessary to sample the position of the transducer head relative to TARGET TRACK CENTER to ensure error free execution of a read operation or write operation. Position samples of transducer head 102 relative to TARGET TRACK CENTER are taken by the disk drive servo system at regular time intervals, indicated at T1, T2, T3, T4, T5, T6, T7, T8, T9 and T10. The corresponding samples on position plot 102 are indicated as S1, S2, S3, S4, S5, S6, S7, S8, S9, and S10. In one embodiment, if three consecutive samples (i.e., a desired number of samples) fall within the desired READ SETTLE WINDOW 94 or WRITE SETTLE WINDOW 95, the servo processor 38 will determine "read ready" or "write ready" i.e. the transducer head 64 is positioned within a predetermined distance from the target track center. For the seek operation shown in FIG. 7, the transducer head 64 is read ready after sample S3 since three consecutive samples S1, S2, and S3 all fall within the READ SETTLE WINDOW 94. The transducer head 64 is write ready at the time of sample S10, since it is positioned within the WRITE SETTLE WINDOW 95 for three consecutive samples S8, S9, and S10. As has been shown in FIGS. 6 and 7, particularly in light of the difference in settle criteria between read or write operations, it is advantageous to have a different seek profile and settle window for a read command than for a write command to maximize disk drive performance.

Figure 8:
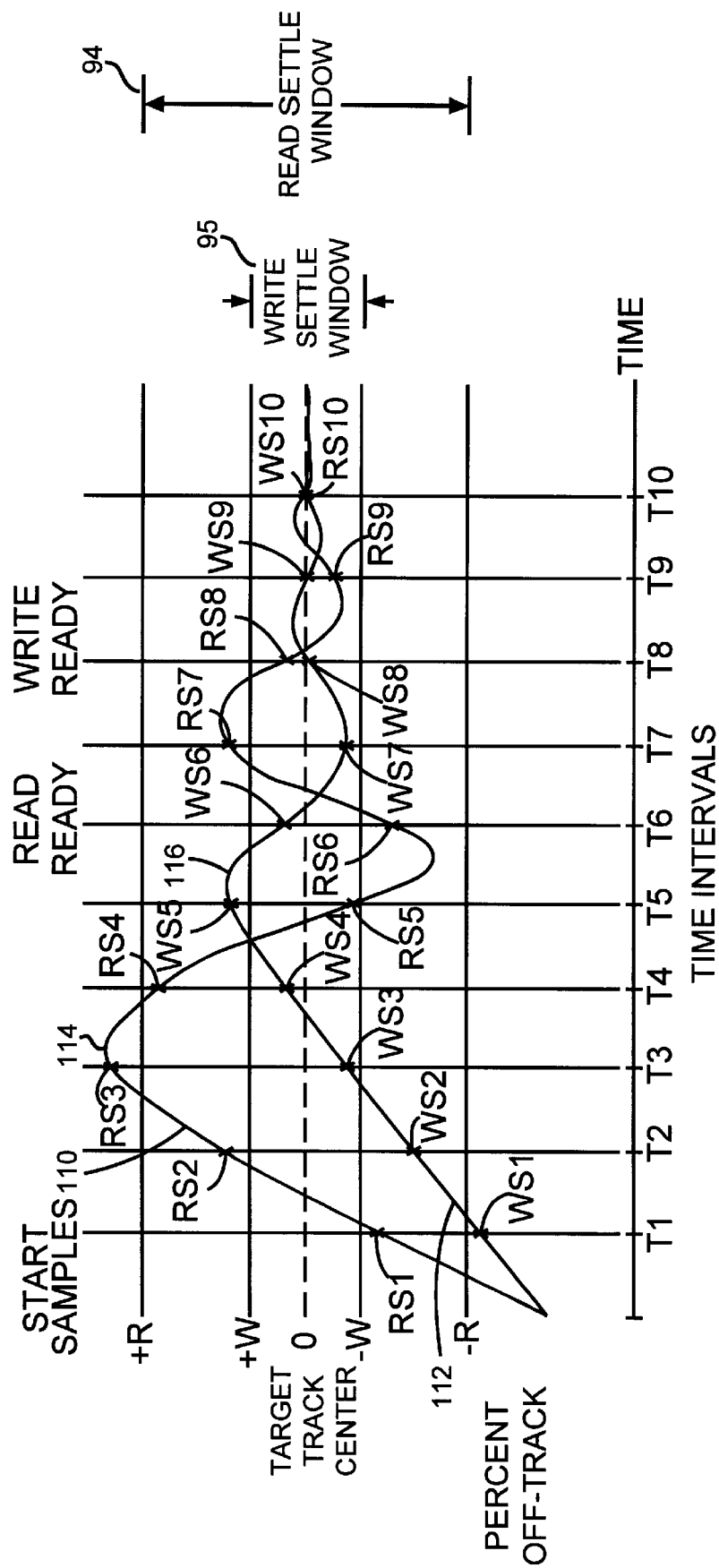
FIG. 8 is a diagram illustrating one embodiment of using different read and write seek profiles for a seek distance, for positioning and alignment of a disk drive head within a read or write settle window for execution of a read or write command in accordance with the invention.

In FIG. 8, a diagram is illustrated showing one exemplary embodiment of using different read and write seek profiles for positioning and alignment of a head within a READ SETTLE WINDOW 94 or WRITE SETTLE WINDOW 95 for execution of a read or write command to reduce data access times in accordance with the present invention. As shown, a position plot 110 illustrates the position of transducer 64 as it reaches the target track after a seek using an aggressive read seek profile. Position plot 112 corresponds to a less aggressive seek profile for execution of a write command. Since the settle criteria for execution of a read operation, indicated by READ SETTLE WINDOW 94, is less strict than the settle criteria for execution of a write operation indicated by WRITE SETTLE WINDOW 95, the read seek profile can be much more aggressive than the write seek profile, thereby reducing data access time of the disk drive. Servo system 34 samples the position of each seek operation relative to the TARGET TRACK CENTER, indicated by sample intervals T1, T2, T3, T4, T5, T6, T7, T8, T9 and T10. The corresponding read seek profile samples are indicated at RS1, RS2, RS3, RS4, RS5, RS6, RS7, RS8, RS9, and RS10. The corresponding write seek profile samples are indicated at WS1, WS2, WS3, WS4, WS5, WS6, WS7, WS8, WS9, and WS10.

In the exemplary embodiment shown, in accordance with the settle criteria illustrated, three consecutive samples which fall within a desired READ SETTLE WINDOW 94 or WRITE SETTLE WINDOW 95 indicate a corresponding read ready or write ready of the actuator. As such, a much more aggressive read seek profile 110 can be used due to the less stringent settle criteria for execution of a read operation. Although read seek profile 110 over shoots the READ SETTLE WINDOW 94, indicated at 114, the much more aggressive read seek profile 110 is read ready at time interval T6 due to the read transducer head falling within the READ SETTLE WINDOW 94 for three consecutive read samples RS4, RS5, and RS6. A less aggressive write seek profile 112 is used, wherein write seek profile 112 is less aggressive (has less energy) relative to read seek profile 110. The less aggressive write seek profile 112 minimizes the over shoot of the transducer head of the WRITE SETTLE WINDOW 95, allowing the actuator to be write ready at time interval T8 (indicated by 3 consecutive samples WS6, WS7 and WS8 being within WRITE SETTLE WINDOW 95). By using a different seek profile for position and alignment of the actuator head for execution of a read command than for execution of a write command, the data access times for both the execution of the read command and execution of the write command can be separately optimized.

Figure 9:
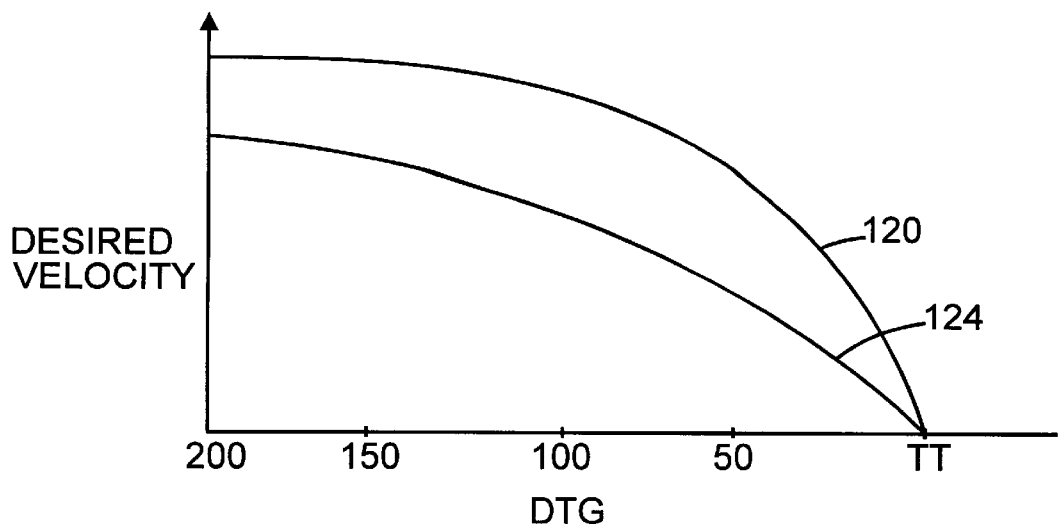
FIG. 9 is a graphical representation illustrating desired velocity of a head as it moves from a current track to a target track, for a hard disk drive having different read and write seek profiles in accordance with the present invention.

In FIG. 9, exemplary desired velocity deceleration trajectories are illustrated for execution of a read or write seek operation along a corresponding seek distance to target track TT. The graph plots desired velocity versus distance to go (DTG) or tracks to go to target track TT. The velocity trajectories correspond to using a less aggressive seek profile for positioning the actuator head for execution of a write instruction, due to the stricter settling criteria. The desired velocity trajectory for a read seek operation is indicated at 120. The velocity trajectory for a less aggressive write seek operation is indicated at 124. Trajectory 120 provides for the head to follow a path at a higher velocity for a larger portion of the seek, resulting in a quicker move time. Write seek trajectory 124 follows a more moderate write seek profile (less energy), and as such, the head takes somewhat longer to arrive at the target track, but does so with a smoother approach resulting in a quicker settle, and overall improved access time.

The present invention provides a method for reducing data access time by independently optimizing the profiles for read seek and write seek operations. Specifically, the acceleration portion of the profile may differ (in amplitude and duration) between read and write seeks, the coast portion may differ (in amplitude and duration) between read and write seeks (or may be omitted), and the deceleration portion of the profile may differ (in amplitude or duration) between read and write seeks.

It is recognized that the trajectories for achieving the read and write seek profiles may be implemented in many ways. One acceleration trajectory implementation is accomplished by applying maximum acceleration for a given length of time, or until a desired state is reached. A second implementation is to apply a constant acceleration, but less than maximum acceleration. A third implementation involves tracking a pre-defined trajectory. In one preferred embodiment for the coast mode, the velocity is held constant. One embodiment for the deceleration trajectory involves defining a look-up table relating to the distance from the current track to the target track, and the desired velocity for that distance. Another embodiment includes one or more polynomial equations describing the position versus the desired velocity relationship. Other implementations will become apparent to those skilled in the art after reading the disclosure of the present invention.

Figure 10:
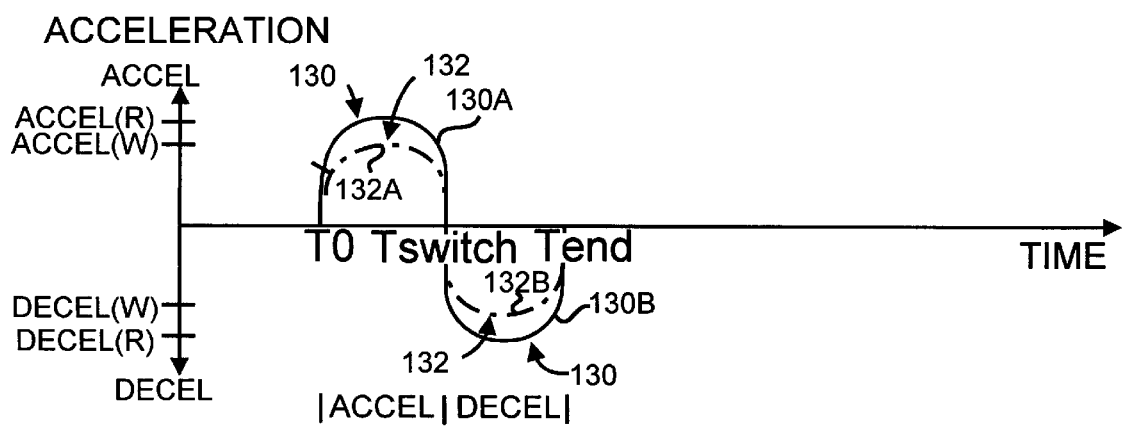
FIG. 10 is a graph illustrating one exemplary embodiment of read and write profiles for a given seek distance for a hard disk drive in accordance with the present invention.
Figure 11:
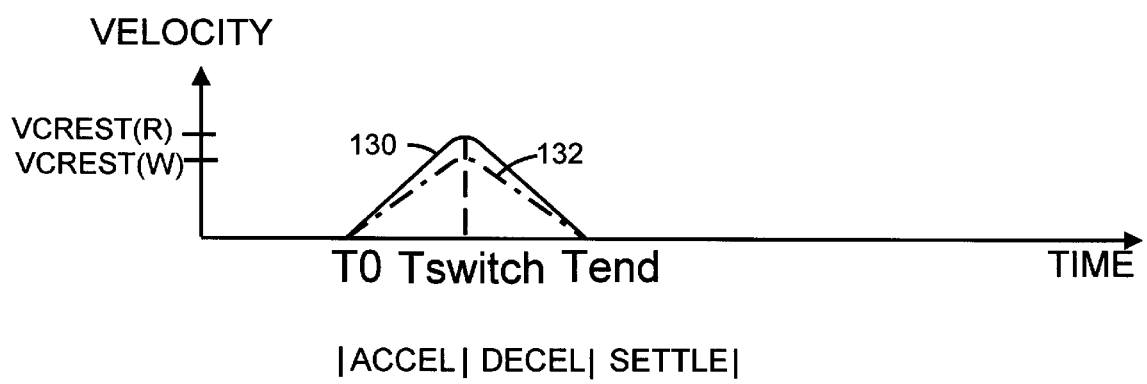
FIG. 11 is a graph illustrating read and write velocity profiles corresponding to the read and write seek profiles of FIG. 10.

In FIG. 10, a graph illustrates one exemplary embodiment of a disk drive having different read and write seek profiles for a given seek distance for reduced data access times in accordance with the present invention. The graph illustrates commanded acceleration of the actuator versus time. A read seek profile is indicated at 130, having read acceleration profile 130A and read deceleration profile 130B. In the exemplary embodiment shown, for read seek profile 130, at time T0, the head is commanded to maximum acceleration, reaching a peak acceleration of ACCEL(R). Referring also to FIG. 11, which is a velocity plot corresponding to the seek profiles of FIG. 10, this acceleration is maintained until the velocity of the head reaches a peak value VCREST(R). This occurs at time Tswitch. The head is then commanded to maximum deceleration reaching a maximum deceleration DECEL(R), until time Tend at which time the deceleration is brought back to zero.

A less aggressive write seek profile for the same corresponding seek distance is indicated at write seek profile 132, having write acceleration profile 132A and write deceleration profile 132B. The head is commanded (at time T0) to an acceleration profile 132A reaching a peak acceleration of ACCEL(W), which is less than ACCEL(R). This acceleration is maintained until the velocity of the head reaches a peak value VCREST(W) which is less than the peak value VCREST(R) for the corresponding read seek profile 130. This occurs at time Tswitch. The head is then commanded to decelerate DECEL(W), following deceleration profile 132B until time Tend at which time the deceleration is brought back to zero (and correspondingly, the velocity is zero). Since FIG. 10 and FIG. 11 are idealized or commanded graphical representations, the velocity of the head during the settle period is not illustrated.

Figure 12:
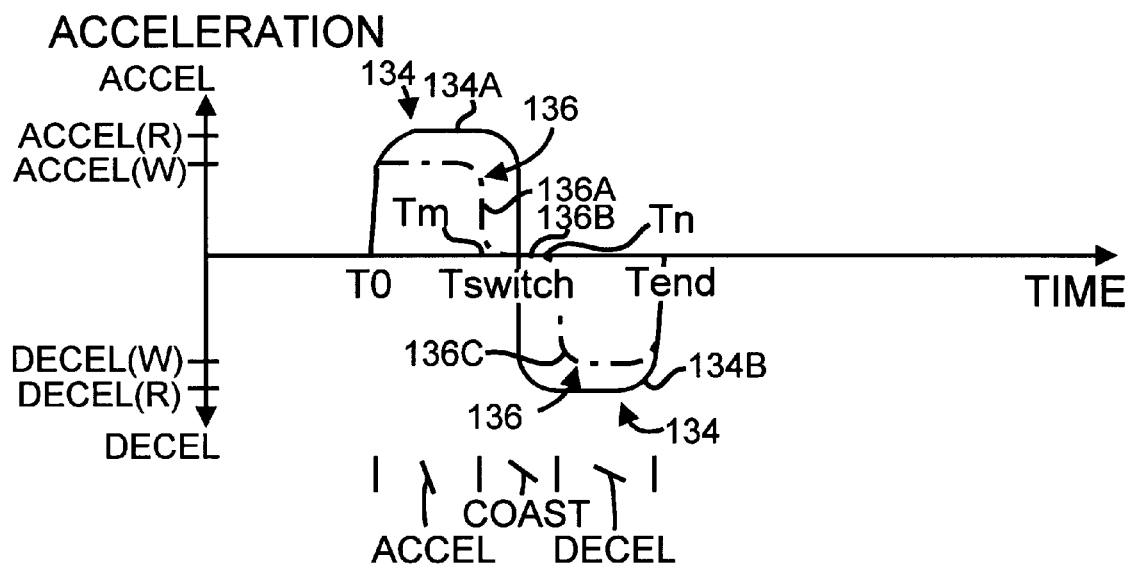
FIG. 12 is a graph illustrating another exemplary embodiment of a read and write seek profile for a given seek distance for use with a hard disk drive in accordance with the present invention.
Figure 13:
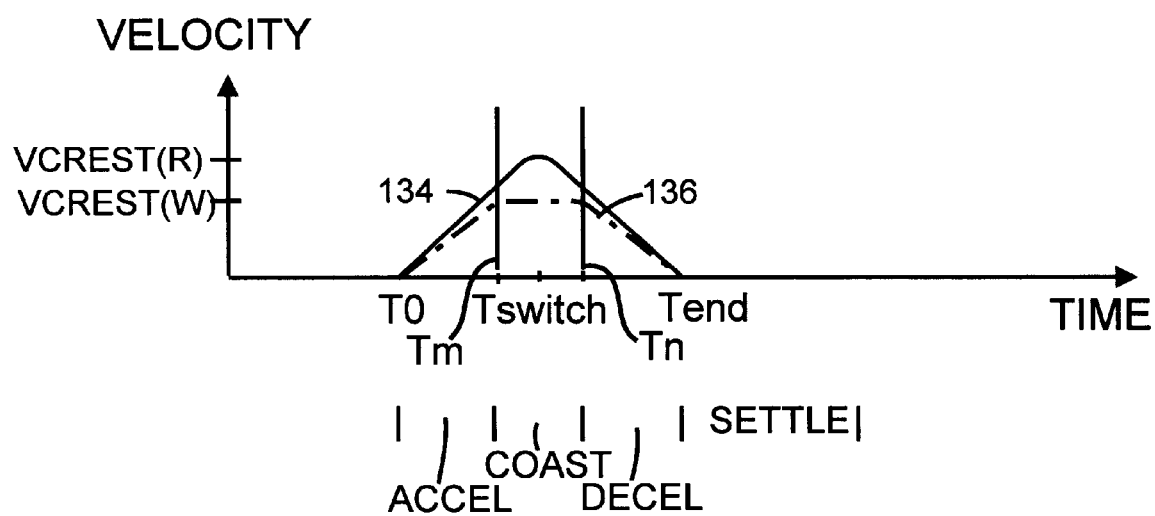
FIG. 13 is a graph illustrating read and write velocity profiles corresponding to the read and write seek profiles of FIG. 12.

Referring to FIGS. 12 and 13, commanded acceleration seek profiles and corresponding velocity seek profile plots graphically illustrate another exemplary embodiment of a hard disk drive having different read and write seek profiles for a given seek distance in accordance with the present invention. A read seek profile is illustrated at 134 having read acceleration profile 134A and read deceleration profile 134B. A less aggressive write seek profile is illustrated at 136 having write acceleration profile 136A, coast profile 136B, and write deceleration profile 136C. In reference to read seek profile 134, the head is commanded to maximum acceleration at time T0 until it reaches acceleration ACCEL (R). This acceleration is maintained until the velocity of the head reaches a peak value VCREST(R) which can be less than maximum permitted head velocity. This occurs at time Tswitch. The head is then commanded to maximum deceleration, reaching DECEL(R), until time Tend, at which time the deceleration is brought back to zero.

Figure 14:
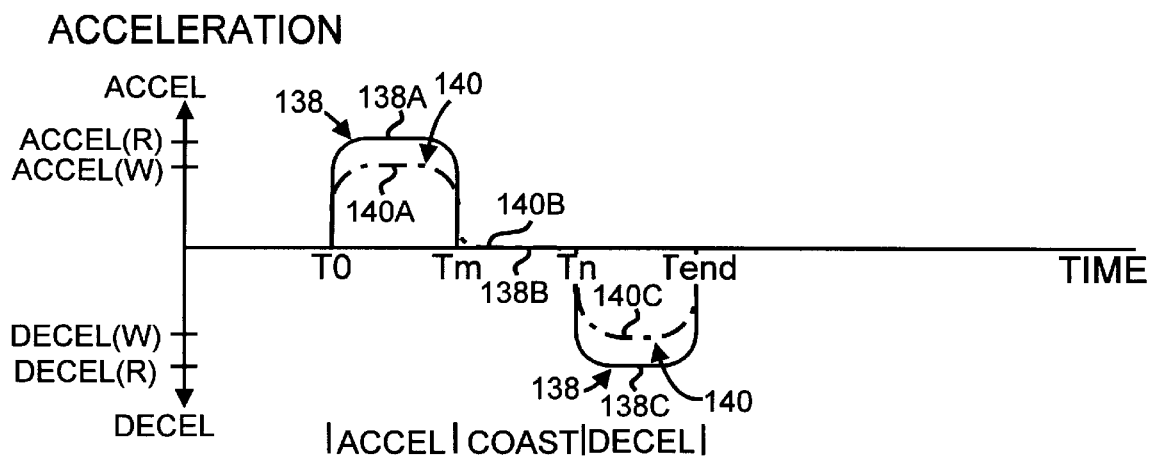
FIG. 14 is a graph illustrating another exemplary embodiment of read and write seek profiles for a given seek distance for use with a hard disk drive in accordance with the present invention.

For the same corresponding seek distance, write seek profile 136 differs from read seek profile 134 both in amplitude and duration. In particular, write acceleration profile 136A is different from read acceleration profile 134A in amplitude and duration; write deceleration profile 134C is different from read deceleration profile 134B in both amplitude and duration; and write seek profile 136 includes additional coast profile 136B. To follow write acceleration profile 136A, the head is commanded to acceleration ACCEL(W) at time $T_0$. This acceleration is held until the head reaches a desired crest velocity VCREST(W) at time Tm (a time less than read seek profile 134). In this example, the velocity VCREST(W) is held (in a "coast" mode, indicated by coast profile 136B) until the time $T_n$, at which time the head is commanded to deceleration DECEL(W), following write deceleration profile 136C until the velocity decreases to zero at time Tend. FIG. 13 and FIG. 14 are idealized or commanded graphical representations, and as such, the velocity of the transducer head during the settle period is not illustrated.

Figure 15:
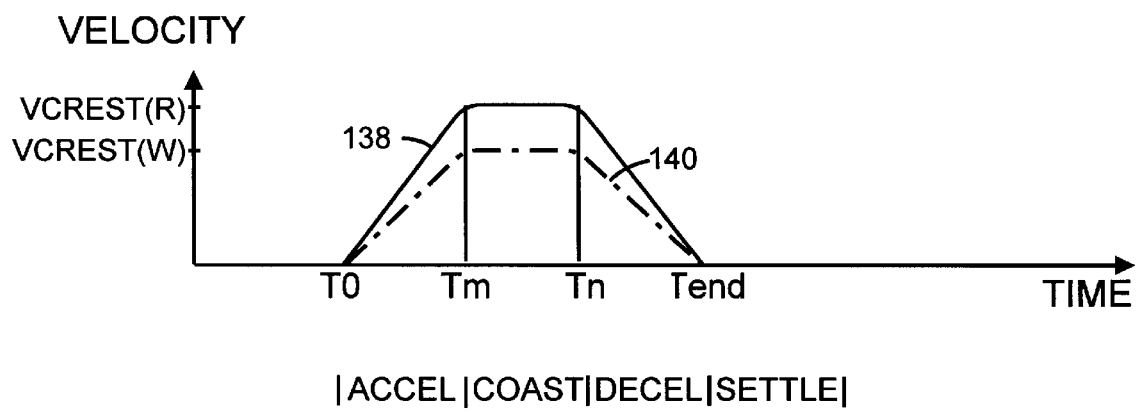
FIG. 15 is a graph illustrating read and write velocity profiles corresponding to the read and write seek profiles of FIG. 14.

Referring to FIGS. 14 and 15, commanded acceleration and velocity seek profiles graphically illustrate another exemplary embodiment of different read and write seek profiles for a given seek distance for execution of a read or write command for a disk drive in accordance with the present invention. A read seek profile is indicated at 138 having read acceleration profile 138A, read coast profile 138B, and read deceleration profile 138C. A write seek profile is indicated at 140, having write acceleration profile 140A, write coast profile 140B, and write deceleration profile 140C. Write seek profile 140 is different than read seek profile 138 in amplitude. In particular, write acceleration profile 140A differs from read acceleration profile 138A in amplitude; write coast profile 140B is different than read coast profile 138B in (velocity) amplitude; and write deceleration profile 140C is different than read deceleration profile 138C in amplitude.

In reference to read seek profile 138, at time T0, the head is commanded to maximum acceleration, reaching acceleration ACCEL(R). This acceleration is held until the head reaches maximum velocity VCREST(R) at time Tm, where Tm is the length of time required to reach maximum velocity. In this example, the maximum velocity VCREST(R) is held (in a "coast" mode, indicated by read coast profile 138B) until time $T_n$, at which time the head is commanded to maximum deceleration DECEL(R), and follows read deceleration profile 138C until the head velocity decreases to zero at time Tend.

Referring to write seek profile 140, at time T0 the head is commanded to acceleration ACCEL(W), which is less than acceleration ACCEL(R), following write acceleration profile 140A. This acceleration is held until the head reaches velocity VCREST(W) at time $T_m$, where $T_m$ is the length of time required to reach velocity VCREST(W). In this example, the velocity VCREST(W) is held (in a coast mode, following write coast profile 140B) until time $T_n$, at which time the head is commanded to deceleration DECEL(W) following write deceleration profile 140C until the velocity decreases to zero at time $T_n$.

Figure 16:
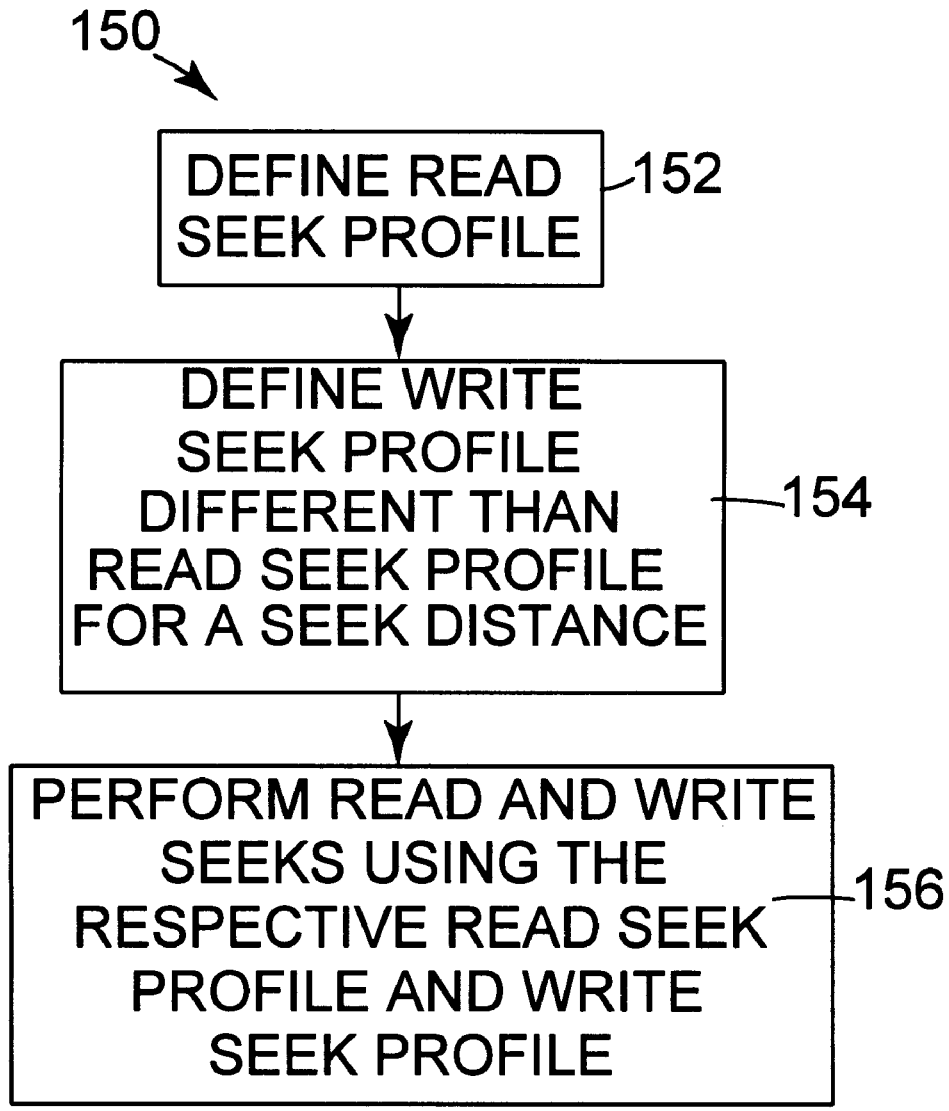
FIG. 16 is a flow chart illustrating one exemplary embodiment of a method for reducing data access times in a hard disk drive in accordance with the present invention.

In FIG. 16, a flow diagram illustrating one exemplary embodiment of a method of reducing data access time in a disk drive having an actuator and a servo controller in accordance with the present invention by using a different seek profile and for a read command than for a write command is shown at 150. The servo controller commands the actuator to perform a seek from a current position to a target position using a profile of command effort to the actuator. The profile includes an acceleration period and a deceleration period. A read profile is defined for a seek used to position the actuator to execute a read command, indicated at 152. A write profile is defined for a seek used to position the actuator to execute a write command, the write profile being different from the read profile for a respective read distance, indicated at 154. Read and write seeks are performed using the corresponding read profile and write profile, indicated at 156, and read and write commands can be executed. The average time required for performing seeks for executing read and write commands is reduced as a result of the optimization resulting from differing read and write profiles.

Figure 17:
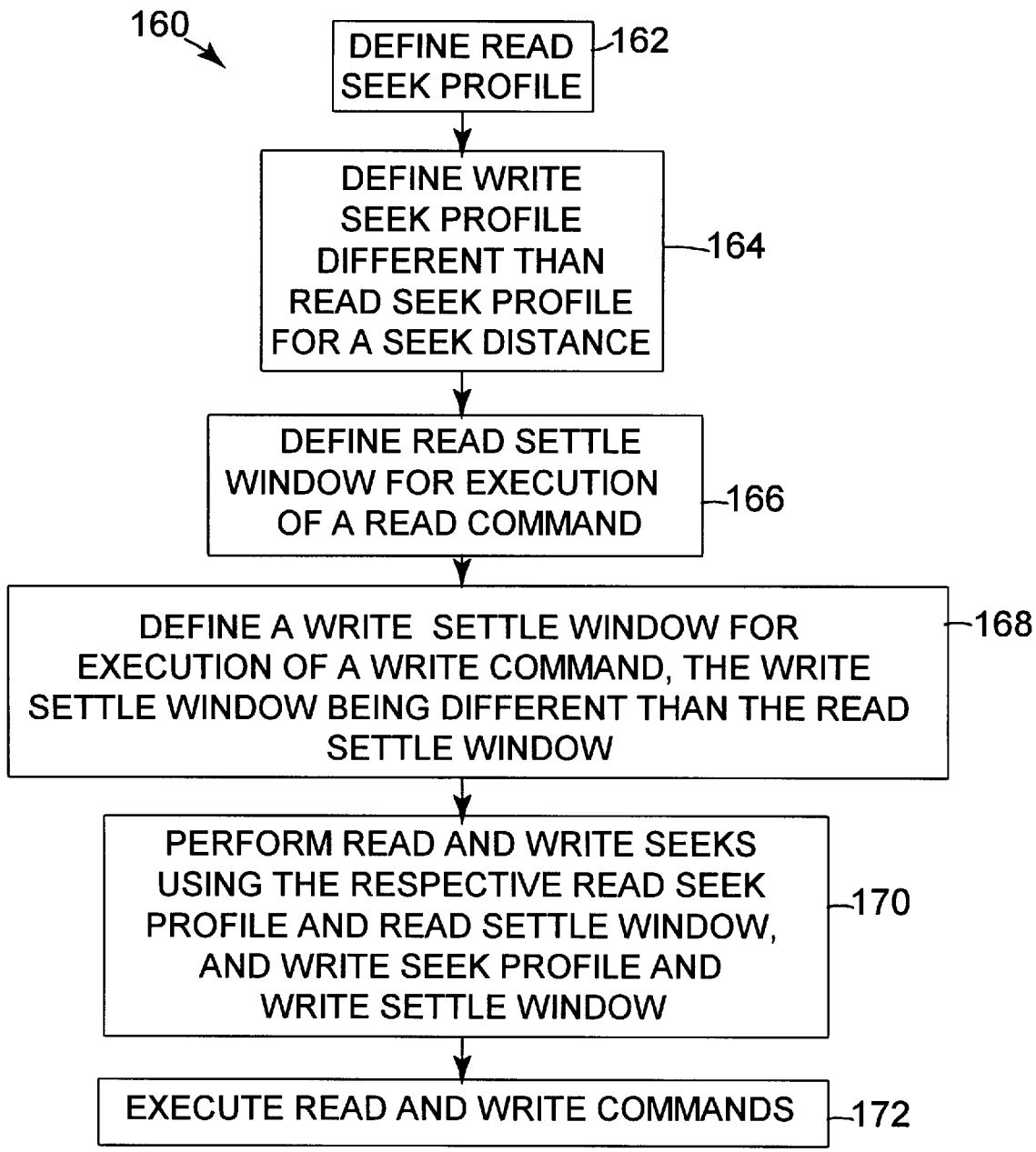
FIG. 17 is a flow chart illustrating another exemplary embodiment of a method for reducing data access times for a hard disk drive in accordance with the present invention.

In FIG. 17, another exemplary embodiment illustrating a method of reducing data access time in a disk drive having an actuator and a servo controller is illustrated at 160. The servo controller commands the actuator to perform a seek from a current position to a target position using a profile of command effort to the actuator. The profile includes an acceleration period and a deceleration period, and a settle window is used to define the required proximity of the actuator to the target position for execution of a command. The method includes defining a read profile for a seek used to position the actuator to execute a read command, indicated at 162. A write profile is defined for a seek used to position the actuator to execute a write command, the write profile being different from the read profile for a respective seek distance, indicated at 164. A read settle window is defined for execution of a read command indicated at 166. A write settle window is defined for execution of a write command, the write settle window being different than the read settle window, indicated at 168. Read and write seeks are performed using the read profile and the read settle window, and the write profile and the write settle window, indicated at 170. After completion of the read or write seek, read and write commands are executed. The average time required for performing seeks for executing read and write commands is reduced as a result of the optimization resulting from differing read and write profiles.

Figure 18:
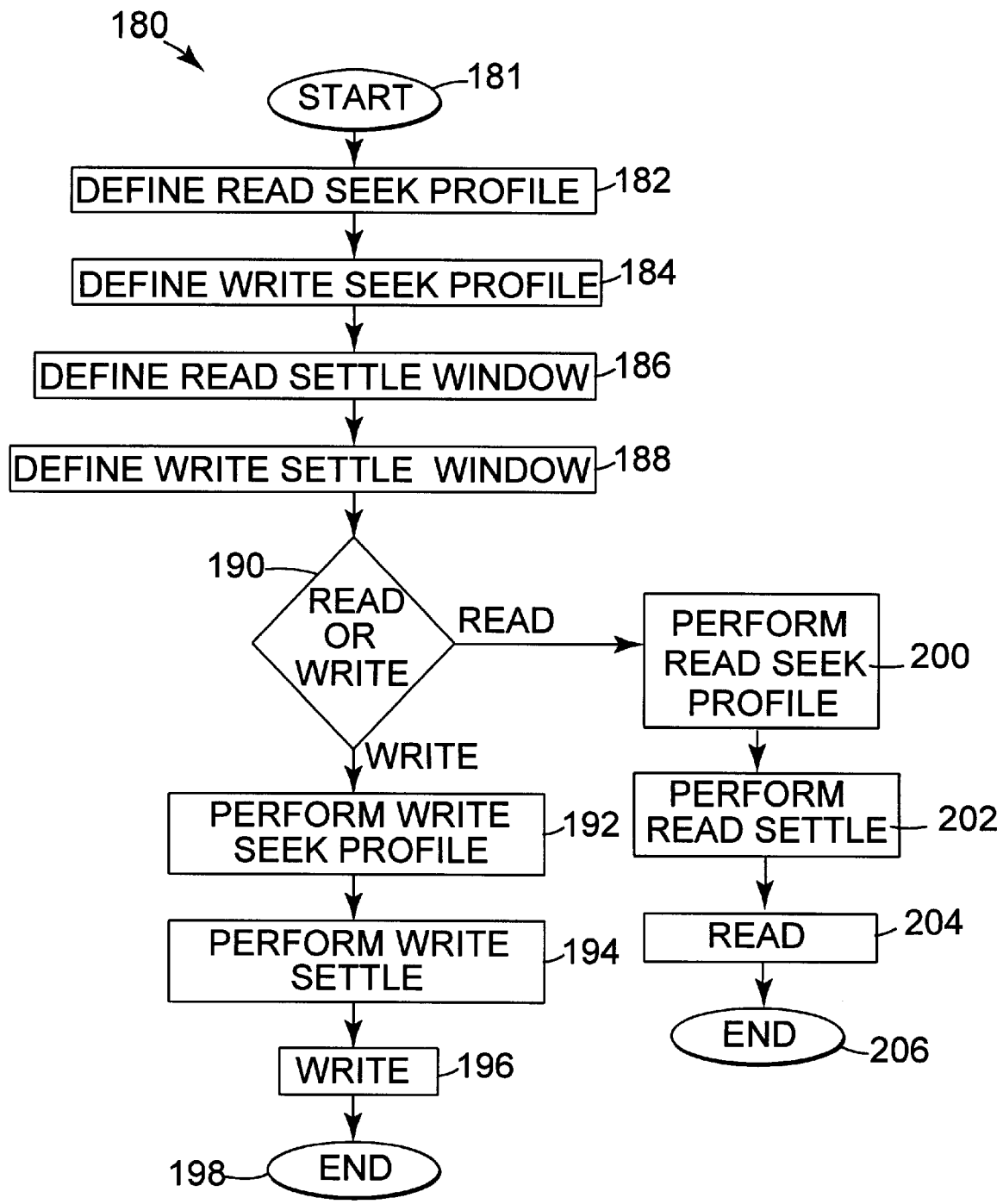
FIG. 18 is a process flow diagram illustrating one exemplary embodiment of a hard disk drive having a method of reducing data access times in accordance with the present invention.

In FIG. 18 (and also referring to FIG. 5), a process flow diagram illustrating one exemplary embodiment of a disk drive having a method of reducing data access time in accordance with the present invention by using a different seek profile and settle window for a read command than for a write command is shown at 180. The disk drive 30 includes a servo system 34 and HDA 36, wherein the servo system 34 performs a seek operation from a current position to a target position using a profile of command effort to the actuator assembly 44 (181). The profile includes an acceleration period, a deceleration period, and optionally, a coast period (see FIGS. 10–15). A settle window (see FIG. 8) is used to define the required proximity or settle criteria of the actuator to the target position for execution of a command (i.e., a read or write command). The method includes defining a read profile for a seek used to position the actuator to execute a read command (182). A write profile is defined for a seek used to position the actuator to execute a write command, the write profile being different from the read profile for a respective seek distance (184). A read settle window is defined for execution of a read command (186). A write settle window is defined for execution of a write command, the write settle window being different than the read settle window (188). The read profile, write profile, read settle window and write settle window parameters are stored in servo memory 80. Upon startup, the parameters of read profile e.g. 130, write profile e.g. 132, Read Settle Window 94 and Write Settle Window 95 are transferred to RAM for fast access by servo processor 38. Servo processor 38 receives a read or write command from a host through an intelligent controller for a specified seek distance (i.e., for reading or writing to a target track where the current track is known and stored in memory). If a write command is received (190), the write seek is performed using the write profile associated with the specified seek distance and the Write Settle Window 95. Once the actuator meets the desired "write ready" criteria and is centered on the target track, data may be written to the target track (186), and the write process is complete (198).

If a read command (190) is received by servo processor 44 for a given seek distance, the read seek is performed using the read profile (200) and read settle window (202). Once the actuator meets the desired "read ready" criteria and is aligned with the target track, data may be read (204) using the servo system and transferred to the intelligent controller. The read process is now complete (206).

We claim:

1. A method of reducing data access time in a disk drive having an actuator and a servo controller, wherein the servo controller commands the actuator to perform a seek from a current position to a target position using a profile of command effect to the actuator, the profile comprising an acceleration profile and a deceleration profile, the method comprising the steps of:

defining a read profile for a seek used to position the actuator to execute a read command;

defining a write profile for a seek used to position the actuator to execute a write command, the write profile being different from the read profile for a respective seek distance;

performing read and write seeks using a read profile and the write profile; and executing read and write commands;

wherein a window defines the required proximity of the actuator to the target position for execution of a command, further comprising the steps of:

defining a read settle window for execution of a read command;

defining a write settle window for execution of a write command, the write settle window being different than the read settle window;

sampling the position of the actuator relative to the target position at predetermined time intervals; and executing the read and write commands after a desired consecutive number of samples fall within the corresponding read settle window or write settle window;

whereby the average time required for a seek operation using the different read and write profiles is reduced versus the average time required for a seek operation using a single profile for both read and write seeks.

2. The method of claim 1, wherein the read settle window is wider than the write settle window.

3. The method of claim 1, wherein defining the read profile further includes the step of defining a read acceleration profile.

4. The method of claim 3, wherein defining the write profile further includes the step of defining a write acceleration profile, the write acceleration profile being different from the read acceleration profile for a respective seek distance.

5. The method of claim 4, wherein defining the read acceleration profile includes a maximum read acceleration value and wherein defining the write acceleration profile includes a maximum write acceleration value, wherein the maximum read acceleration value is greater than the maximum write acceleration value.

6. The method of claim 4, wherein defining the read acceleration profile includes a read maximum velocity value, and wherein defining the write acceleration profile includes a write maximum velocity value, the read maximum velocity value being greater than the write maximum velocity value.

7. The method of claim 1, wherein defining the read profile further includes the step of defining a read deceleration profile.

8. The method of claim 7 wherein defining the write profile further includes the step of defining a write deceleration profile, the write deceleration profile being different from the read deceleration profile for a respective seek distance.

9. The method of claim 8, wherein defining the read deceleration profile includes a maximum read deceleration value and wherein defining the write deceleration profile includes a maximum write deceleration value, wherein the maximum read deceleration value is greater than the maximum write deceleration value.

10. The method of claim 8, wherein defining the read deceleration profile includes a read maximum velocity value, and wherein defining the write deceleration profile includes a write maximum velocity value, the read maximum velocity value being greater than the write maximum velocity value.

11. The method of claim 1, wherein defining the read profile further includes the step of defining a read coast profile.

12. The method of claim 11, wherein defining the write profile further includes the step of defining a write coast profile, the write coast profile being different from the read coast profile for a respective seek distance.

13. A method of reducing data access time in a disk drive having an actuator and a servo controller, wherein the servo controller commands the actuator to perform a seek from a current position to a target position using a profile of command effort to the actuator, the profile comprising an acceleration profile and a deceleration profile, and wherein a settle window is used to define the require proximity of the actuator to the target position for execution of a command, the method comprising the steps of:

defining a read profile for a seek used to position the actuator to execute a read command;

defining a write profile for a seek used to position the actuator to execute a write command, the write profile being different from the read profile for a respective seek distance;

defining a read settle window for execution of a read command;

defining a write settle window for execution of a write command, the read settle window being wider than the write settle window;

performing read and write seeks using the read profile and the read settle window, and the write profile and the write settle window;

executing read and write commands;

sampling the position of the actuator relative to the target position at predetermined time intervals; and executing the read and write commands after a desired consecutive number of samples fall within the corresponding read settle window or write settle window;

whereby the average time required for a seek operation using the different read and write profiles and different read and write settle windows is reduced versus the average time required for a seek operation using a single profile for both read and write seeks and different read and write settle windows.

14. The method of claim 13, wherein defining the read profile further includes the step of defining a read acceleration profile; and wherein defining the write profile further includes the step of defining a write acceleration profile, the write acceleration profile being different from the read acceleration profile for a respective seek distance.

15. The method of claim 13, wherein defining the read profile further includes the step of defining a read deceleration profile; and wherein defining the write profile further includes the step of defining a write deceleration profile, the read deceleration profile being different than the write deceleration profile.

16. The method of claim 13, wherein defining the read profile further includes the step of defining a read coast profile; and wherein defining the write profile further includes the step of defining a write coast profile, the read coast profile being different than the write coast profile.

* * * * *